United States Patent
Murphy et al.

(10) Patent No.: US 8,022,107 B2
(45) Date of Patent: Sep. 20, 2011

(54) FLUORINATED POLYOXYALKYLENE GLYCOL DIESTER SURFACTANTS

(75) Inventors: Peter Michael Murphy, Chadds Ford, PA (US); Anilkumar Raghavanpillai, Wilmington, DE (US)

(73) Assignee: E.I. duPont de Nemours and Company, Wilmington, DE (US)

( * ) Notice: Subject to any disclaimer, the term of this patent is extended or adjusted under 35 U.S.C. 154(b) by 371 days.

(21) Appl. No.: 12/254,954

(22) Filed: Oct. 21, 2008

(65) Prior Publication Data

US 2010/0099837 A1    Apr. 22, 2010

(51) Int. Cl.
C09K 3/00    (2006.01)
B01F 17/00    (2006.01)

(52) U.S. Cl. ........ 516/106; 516/203; 526/321; 252/88.2

(58) Field of Classification Search .................. 516/106, 516/203; 526/321; 252/88.2
See application file for complete search history.

(56) References Cited

U.S. PATENT DOCUMENTS

| | | | |
|---|---|---|---|
| 3,231,604 A | 1/1966 | Bruce | |
| 3,929,873 A | 12/1975 | Gammans | |
| 3,979,469 A | 9/1976 | Jager | |
| 4,079,084 A | 3/1978 | Houghton | |
| 5,481,028 A | 1/1996 | Petrov et al. | |
| 5,759,968 A | 6/1998 | Furutani et al. | |
| 5,962,117 A | 10/1999 | Furutani et al. | |
| 6,537,662 B1 | 3/2003 | Kamrath et al. | |
| 7,399,887 B1 | 7/2008 | Murphy et al. | |
| 7,737,307 B2 * | 6/2010 | Murphy et al. | 568/615 |

FOREIGN PATENT DOCUMENTS

| | | |
|---|---|---|
| DE | 2656423 | 6/1978 |
| EP | 1505098 A1 | 2/2010 |
| JP | 1998251578 | 9/1998 |
| JP | 1998251579 | 9/1998 |
| JP | 2004300369 | 10/2004 |
| JP | 2005215153 | 8/2005 |
| SU | 566829 | 10/1977 |
| WO | 9511877 | 5/1995 |
| WO | 2008/118494 A1 | 10/2008 |
| WO | 2009/020907 A1 | 2/2009 |
| WO | 2009/055561 A1 | 4/2009 |

OTHER PUBLICATIONS

Balague, J. et al., Synthesis of fluorinated telomers. Part 1. Telomerization of vinylidene fluoride with perfluoroalkyl iodides; Journal of Fluorine Chemistry, 1995, vol. 70, 215-223.

Dehelean, T., et al., Surface active agents on the basis of perfluorinated organic acids., Institut Chem., Academie Roumaine, Timisoara, 1900, Rom. Revue Roumaine de Chimie, (2001), Volume date 2000, 45(4), 375-379—Abstract.

Dehelean, T., et al., Surfactants from perfluorinated organic acids, Institut Chemistry, Timisoara, 1900, Rom. World Surfactants Congress, 4th, Barcelona, Jun. 3-7, 1996 vol. 4, 66-71 Publisher: Associacion Espanola de Productores de Sustancias para Aplicacones Tensioactivas, Barcelona, Spain, Abstract.

Honda, K., et al., Molecular aggregation structure and surface properties of poly(fluoroalkyl acrylate) thin films, American Chemical Society, Macromolecules (2005) 38, 5699-5705.

Lele, B. S., et al., Single step room temperature oxidation of poly-(ethylene glycol) to Poly(oxyethylene)-dicarboxylic acid, (1998) Journal of Applied Polymer Science, vol. 70, 883-890.

* cited by examiner

*Primary Examiner* — Ling Choi
*Assistant Examiner* — Chun-Cheng Wang
(74) *Attorney, Agent, or Firm* — Nancy S. Mayer

(57) ABSTRACT

A fluorinated polyoxyalkylene glycol diester surfactant of formula 1

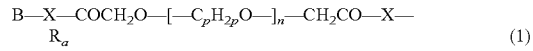

wherein
B is M or $R_a$,
M is an ionizable hydrogen, ammonium, alkali metal, or alkaline earth metal,
p is from about 2 to about 4,
n is from about 5 to about 43,
X is O, S, or $SCH_2CH_2O$,
$R_a$ is $R_f(CH_2CF_2)_d$—$(C_gH_{2g})$—; $R_f[OCF_2CF_2]_r$—$(C_gH_{2g})$—; $R_f(CH_2)_h[(CF_2CF_2)_i(CH_2CH_2)_j]_k$—; or $R_fOY$—;
Y is $CFHCF_2O(CH_2CH_2O)_v$—$(C_gH_{2g})$—; $CFHCF_2O(C_wH_{2w})$—; or $CF(CF_3)CONH$—$(C_gH_{2g})$—;
each $R_f$ is independently $C_cF_{(2c+1)}$ wherein c is 1 to about 6; d is 1 to about 3; g is 1 to about 4; or 1; r is 1 to about 4; h is 1 to about 6; i, j, and k are each independently 1, 2, or 3, or a mixture thereof; provided that the total number of carbon atoms in $R_f(CH_2)_h[(CF_2CF_2)_i(CH_2CH_2)_j]_k$— is from about 8 to about 22; v is 1 to about 4; and w is from about 2 to about 12.

17 Claims, No Drawings

FLUORINATED POLYOXYALKYLENE GLYCOL DIESTER SURFACTANTS

FIELD OF THE INVENTION

This invention relates to a fluorinated polyoxyalkylene glycol diester and use thereof as a surfactant.

BACKGROUND OF THE INVENTION

Most commercially available fluorinated surfactants are produced through electrochemical fluorination or telomerization. Electrochemical fluorination utilizes anhydrous hydrofluoric acid as the fluorine source. However, industrially produced hydrofluoric acid contains impurities; which requires use of further complicated processes to remove these impurities.

Telomerization processes use tetrafluoroethylene as the starting material. However, tetrafluoroethylene is a hazardous and expensive intermediate with limited availability. The telomerization products contain a mixture of homologs which contain a distribution of different carbon chain lengths, typically containing chain lengths of from about 4 to about 20 carbons. Therefore, in order to produce fluorinated surfactants which contain a fluorinated carbon chain of fixed length, and not a mixture of various lengths, some sequential separation of telomerization products is required, as described by Erik Kissa in "Fluorinated Surfactants, Synthesis-Properties-Applications". For example, U.S. Pat. No. 6,537,662 discloses a fluorochemical which may be incorporated into a soil-resistant spin finish composition as one of the optional additives. The fluorochemical additive includes a fluorochemical polyoxyethylene diester which is prepared by reacting polyethylene glycol biscarboxymethyl methyl ether with a telomer based fluoroalkyl alcohol.

There is disadvantage of using such fluorinated surfactants containing longer perfluoroalkyl chains. For example, Koji Honda et al., in "Molecular Aggregation Structure and Surface Properties of Poly(fluoroalkylacrylate) Thin Films" Macromolecules (2005), 38(13), 5699-5705, teach that the orientation of the perfluoroalkyl chains of at least 8 carbons is maintained in a parallel configuration, while for such perfluoroalkyl chains containing less than 6 carbons, reorientation occurs. This reorientation decreases performance effects for altering surface behaviors. Further, the price of fluorinated surfactant is primarily determined by the amount of fluorine incorporated in compound. Therefore, it is desirable to obtain fluorinated surfactants which can be prepared from fluorinated chemicals other than telomers. It is further desired to obtain fluorinated surfactants which contain shorter fluorinated chains or fluorinated groups and still provide essentially the same or even superior performance for altering surface behaviors. Especially desirable is lowering surface tension, and providing to liquids low surface tension, low interfacial surface tension values, and low critical micelle concentrations. The present invention provides such fluorinated surfactants.

BRIEF SUMMARY OF THE INVENTION

The present invention comprises a compound of formula (1)

$$B-X-COCH_2O-[-C_pH_{2p}O-]_n-CH_2CO-X-R_a \quad (1)$$

wherein
B is M or $R_a$,
M is an ionizable hydrogen, ammonium, alkali metal, or alkaline earth metal,
p is from about 2 to about 4,
n is from about 5 to about 43,
X is O, S, or $SCH_2CH_2O$,
$R_a$ is $R_f(CH_2CF_2)_d-(C_gH_{2g})-$; $R_f[OCF_2CF_2]_r(C_gH_{2g})-$; $R_f(CH_2)_h[(CF_2CF_2)_i(CH_2CH_2)_j]_k-$; or $R_fOY-$;
Y is $CFHCF_2O(CH_2CH_2O)_v-(C_gH_{2g})-$; $CFHCF_2O(C_wH_{2w})-$; or $CF(CF_3)CONH-(C_gH_{2g})-$;
each $R_f$ is independently $C_cF_{(2c+1)}$ wherein c is 1 to about 6;
d is 1 to about 3;
g is 1 to about 4;
r is 1 to about 4;
h is 1 to about 6;
i, j, and k are each independently 1, 2, or 3, or a mixture thereof; provided that the total number of carbon atoms in $R_f(CH_2)_h[(CF_2CF_2)_i(CH_2CH_2)_j]_k-$ is from about 8 to about 22;
v is 1 to about 4; and
w is from about 2 to about 12.

The present invention further comprises a method of altering the surface behavior of a liquid comprising adding to the liquid a compound of formula (1) as described above, or a mixture thereof.

DETAILED DESCRIPTION OF THE INVENTION

Herein trademarks are shown in upper case.

Herein the term "twin-tailed surfactant" is used to describe a surfactant having two hydrophobic groups attached to a single connecting hydrophilic group. The two hydrophobic groups may be the same, designated as "symmetrical twin-tailed surfactant", or dissimilar, designated as "hybrid twin-tailed surfactant".

The present invention provides a fluorinated polyoxyalkylene glycol diester surfactant, which contains fluorinated groups having no more than 6 carbons in the fluorinated group. The fluorinated polyoxyalkylene glycol diester surfactant of the present invention unexpectedly provides very low surface tension of less than 25 mN/m at 0.6% by weight in water, preferably less than 21 mN/m at a concentration of 0.6% by weight in water, and also has low CMC values. The fluorinated polyoxyalkylene glycol diester surfactant of the present invention is a twin-tail surfactant which contains, in sequence, a hydrophobic group, a hydrophilic group, and preferably a second hydrophobic group. Such a twin-tail, fluorinated polyoxyalkylene glycol diester surfactant, is useful for altering surface behavior, typically for lowering surface tension, and can be used in a variety of applications, such as coatings, cleaners, oil fields, and many other applications. The surfactant is also useful in many applications involving wetting, leveling, antiblocking, foaming, and the like.

The fluorinated polyoxyalkylene glycol diester surfactant of formula (1) of the present invention comprises at least one hydrophobic part, preferably two hydrophobic parts, which contains the partially fluorinated Ra group as described above. The compound of the present invention also comprises a water soluble hydrophilic part. The surfactants of the present invention are nonionic surfactants, which carry no electrical charge, and the water solubility is conferred by the presence of highly polar groups, polyoxyethylene, $-(OCH_2CH_2)_n-$ of varying length. The water solubility of such surfactants tends to increase when the value of n increases. In an aqueous medium system, the surface activity is controlled by the balance between the hydrophilic and hydrophilic components.

One of the advantages of using the surfactants comprising the fluorinated polyoxyalkylene glycol diester of the present invention in altering surface behavior is to achieve the same or even superior performance while using reduced concentration of the fluorinated surfactant having reduced fluorine content, thus increasing the "fluorine efficiency". The term "fluorine efficiency" as used herein means the ability to use a minimum amount of fluorosurfactant to obtain a desired surface effect or surface property when applied to a substrate, or to obtain better performance using the same level of fluorine. Further, the fluorinated polyoxyalkylene glycol diester surfactant of the present contains shorter fluorinated chains or fluorinated groups, which unexpectedly provides essentially the same or even superior performance in altering surface behavior when compared to conventional surfactants containing longer fluorinated chains.

The fluorinated polyoxyalkylene glycol diester surfactants of the present invention have the structure of formula (1):

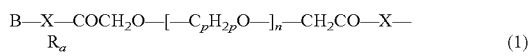
(1)

wherein
B is M or $R_a$,
M is an ionizable hydrogen, ammonium, alkali metal, or alkaline earth metal,
p is from about 2 to about 4,
n is from about 5 to about 43,
X is O, S, or $SCH_2CH_2O$,
$R_a$ is $R_f(CH_2CF_2)_d$—$(C_gH_{2g})$—; $R_f[OCF_2CF_2]_r$—$(C_gH_{2g})$—; $R_f(CH_2)_h[(CF_2CF_2)_i(CH_2CH_2)_j]_k$—; or $R_fOY$—;
Y is $CFHCF_2O(CH_2CH_2O)_v$—$(C_gH_{2g})$—; $CFHCF_2O(C_wH_{2w})$—; or $CF(CF_3)CONH$—$(C_gH_{2g})$—;
each $R_f$ is independently $C_cF_{(2c+1)}$ wherein c is 1 to about 6;
d is 1 to about 3;
g is 1 to about 4;
r is 1 to about 4;
h is 1 to about 6;
i, j, and k are each independently 1, 2, or 3, or a mixture thereof; provided that the total number of carbon atoms in $R_f(CH_2)_h[(CF_2CF_2)_i(CH_2CH_2)_j]_k$— is from about 8 to about 22;
v is 1 to about 4; and
w is from about 2 to about 12.

Preferred compounds of formula (1) include those wherein n is from about 6 to about 32, more preferably those wherein n is from about 6 to about 30, and more preferably those wherein n is 6, 10, 20 or 30. Also preferred are those where X is O. Preferred embodiments of the compound of formula (1) are those wherein $R_a$ is $R_f(CH_2CF_2)_d$—$(C_gH_{2g})$—, $R_f$ is $C_cF_{(2c+1)}$ wherein c is 4 or 6, d is 1 or 2, and g is 2. Also preferred are those compounds wherein $R_a$ is $R_f[OCF_2CF_2]_r$—$(C_gH_{2g})$—, $R_f$ is $C_cF_{(2c+1)}$ wherein c is 2 or 3, r is 1, 2 or 3, and g is 2. Another preferred embodiment of the compounds of formula (1) are those wherein $R_a$ is $R_f[OCF_2CF_2]_r(C_gH_{2g})$—, $R_f$ is $C_cF_{(2c+1)}$ wherein c is 3, r is 1, and g is 2. Also preferred are those compounds of formula (1) wherein $R_a$ is $R_fOY$—, $R_f$ is $C_cF_{(2c+1)}$ wherein c is 1, 2 or 3, Y is $CFHCF_2O(C_wH_{2w})$—, and w is 2, 3 or 4. Also preferred are those compounds of formula (1) wherein $R_a$ is $R_fOY$—, $R_f$ is $C_cF_{(2c+1)}$ wherein c is 1, 2 or 3, Y is $CF(CF_3)CONH$—$(C_gH_{2g})$— and g is 2. Also preferred are the compounds of formula (1) wherein $R_a$ is $R_f(CH_2)_h[(CF_2CF_2)_i(CH_2CH_2)_j]_k$—; $R_f$ is $C_cF_{(2c+1)}$ wherein c is 1, 2, or 3, h is 2, k is 1, 2 or 3, i and j are each 1, and X is O or $SCH_2CH_2O$.

The fluorinated polyoxyalkylene glycol diesters of formula (1) of the present invention are synthesized by contacting a carboxylic acid with an alcohol or thiol in the presence of a coupling agent such as dicyclohexylcarbodiimide or 1-[3-(dimethylamino)propyl]-3-ethylcarbodiimide hydrochloride (EDCI) at room temperature. Esterification also can be performed by refluxing carboxylic acid with an alcohol or thiol with p-toluenesulfonic acid. Alternatively, the carboxylic acids can be transformed to corresponding acid chloride and upon esterification of the acid chloride with alcohol in the presence of a base ($Et_3N$) the ester is produced.

Other precursors can also generate esters including reaction of 1) alcohol with acid chloride, 2) alkyl halide with carboxylic acid salts, 3) alcohol with anhydride, and 4) alcohol with ester (tranesterification). Further details on the synthesis of esters are in "Advanced Organic Chemistry", J. March, $3^{rd}$ ed., John Wiley & Sons, New York, N.Y. 1985.

Polyalkylene glycol dicarboxylic acids of molecular weights of about –Mw 250, 400, 600, 1000 and 1450 are used for the esterification. Polyalkylene glycol dicarboxylic acids of –Mw 250 and 600 are commercially available (Aldrich Chemical Co., Milwaukee, Wis.) whereas Mw 400, 1000 and 1450 are synthesized by the literature procedure by the oxidation of corresponding polyalkylene glycol with Jones reagent. (Lele, B. S.; Kulkarni, M. G., Journal of Applied Polymer Science, Vol. 70, 883-890, 1008) or by the oxidation of the glycol as disclosed in U.S. Pat. No. 3,929,873. Preferred are dicarboxylic acids of formula $HOOCCH_2O$—$(CH_2CH_2O)_n$—$CH_2COOH$ wherein n is from about 6 to about 32, in particular wherein n is 6, 10, 20 or 30.

For example, compounds of formula (1) are prepared by reacting a polyalkylene glycol dicarboxylic acid with at least one of the following compositions which represent $R_aXH$ wherein $R_a$ and X are as defined in formula (1):

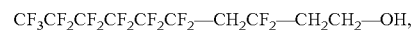

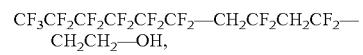

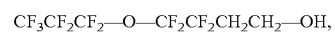

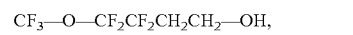

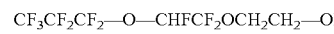

$CF_3CF_2OCHFCF_2O(CH_2CH_2O)CH_2CH_2OH$ $CF_3CF_2CF_2OCHFCF_2O(CH_2CH_2O)_2CH_2CH_2OH$ $CF_3CF_2OCHF_2O(CH_2CH_2O)_2CH_2CH_2OH$ $CF_3CF_2CH_2CH_2CF_2CF_2CH_2CH_2$—OH, $CF_3CF_2CH_2CH_2CF_2CF_2CH_2CH_2CF_2CF_2CH_2CH_2$—OH, $CF_3CF_2CH_2CH_2CF_2CF_2CH_2CH_2CF_2CF_2CH_2CH_2CF_2CF_2CH_2$—OH, $CF_3CF_2OCF_2CF_2$—$CH_2CH_2$—OH, $CF_3CF_2OCF_2CF_2OCF_2CF_2$—$CH_2CH_2$—OH, $CF_3CF_2OCF_2CF_2OCF_2CF_2OCF_2CF_2$—$CH_2CH_2$—OH, $CF_3CF_2OCF_2CF_2OCF_2CF_2$—$CH_2CH_2$—OH, $CF_3CF(CF_3)OCF_2CF_2$—$CH_2CH_2$—OH, $CF_3CF(CF_3)OCF_2CF(CF_3)OCF_2CF_2$—$CH_2CH_2$—OH, $F(CF_2)_c(CH_2)_q[(CF_2CF_2)_i(CH_2CH_2)_j]_k$—OH, $F(CF_2)_c(CH_2)_q[(CF_2CF_2)_i(CH_2CH_2)_j]_k$—$SCH_2CH_2OH$, $CF_3CF_2CF_2OCF(CF_3)CONHCH_2CH_2OH$.

The preparation of the above examples of fluorinated precursor compounds is described below.

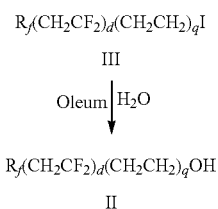

The reaction of vinylidene fluoride with linear or branched perfluoroalkyl iodides produces compounds of the structure $R_f(CH_2CF_2)_qI$, wherein, q is 1 or more and $R_f$ is a C1 to C6 perfluoroalkyl group. For example, see Balague, et al, "Synthesis of fluorinated telomers, Part 1, Telomerization of vinylidene fluoride with perfluoroalkyl iodides", J. Fluorine Chem. (1995), 70(2), 215-23. The specific telomer iodides are isolated by fractional distillation. The telomer iodides are treated with ethylene by procedures described in U.S. Pat. No. 3,979,469 to provide the telomer ethylene iodides (III of Scheme 1) wherein q is 1 to 3 or more. The telomer ethylene iodides (III of Scheme 1) are treated with oleum and hydrolyzed to provide the corresponding telomer alcohols (II of Scheme 1) according to procedures disclosed in WO 95/11877. Alternatively, the telomer ethylene iodides (III of Scheme 1) can be treated with N-methyl formamide followed by ethyl alcohol/acid hydrolysis.

Compounds of formula (1) containing the group $R_f[OCF_2CF_2]_r(C_gH_{2g})$— are obtained from precursor fluoroalcohols of the type of formula $R_fOCF_2CF_2$—$CH_2CH_2OH$ which are available by the following series of reactions wherein $R_f$ is a linear or branched $C_1$ to $C_6$ perfluoroalkyl optionally interrupted by one to three oxygen atoms and q is an integer of 1 to 3:

Scheme 2

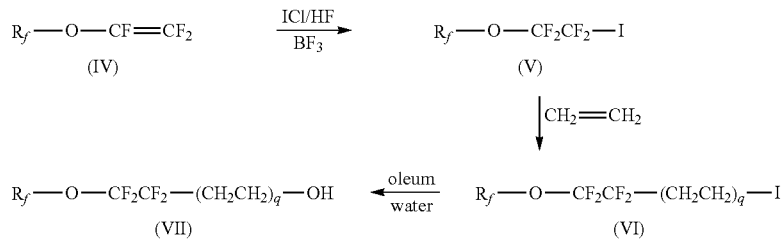

Compounds of formula (1) containing the $R_a$ group $R_f(CH_2CF_2)_d$—$(C_gH_{2g})$— wherein d is 1 to 3 and g is 1 to 4 are prepared from the fluorinated alcohols of the type formula (II):

$R_f$—$(CH_2CF_2)_q(CH_2CH_2)_r$—OH  (II)

wherein $R_f$ is a linear or branched perfluoroalkyl group having 2 to 6 carbon atoms, subscript q is an integer of 1 to 3, and r is 1 to 2. These alcohols are available by synthesis according to Scheme 1 wherein $R_f$, q and r are as defined for Formula (II).

Scheme 1

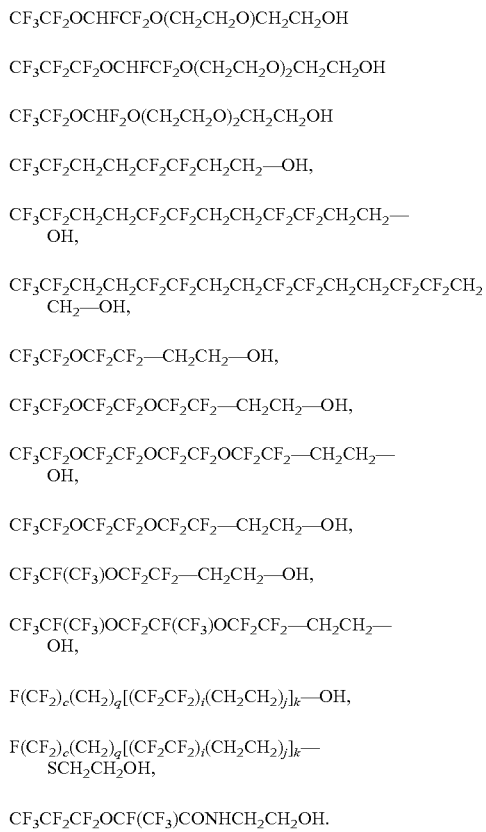

The perfluoroalkyl ether iodides of formula V of Scheme 2 above can be made by the procedure described in U.S. Pat. No. 5,481,028, herein incorporated by reference, in Example 8, which discloses the preparation of compounds of formula V of Scheme 2 from perfluoro-n-propyl vinyl ether. The perfluoalkyl ether iodide of formula V of Scheme 2 is reacted with an excess of ethylene at an elevated temperature and pressure. While the addition of ethylene can be carried out thermally, the use of a suitable catalyst is preferred. Preferably the catalyst is a peroxide catalyst such as benzoyl peroxide, isobutyryl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time can vary with the catalyst and reaction conditions, but 24 hours is usually adequate. The product is purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 hours, and purifying the product by distillation.

The perfluoroalkylether ethylene iodides of formula VI of Scheme 2 are treated with oleum and hydrolyzed to provide the corresponding alcohols of formula VII of Scheme 2 according to procedures disclosed in WO 95/11877 (Elf Atochem S. A.). Alternatively, the perfluoroalkylether ethyl iodides can be treated with N-methyl formamide followed by ethyl alcohol/acid hydrolysis. A temperature of about 130° to 160° C. is preferred.

Compounds of formula (1) containing the group $R_fOCFHCF_2O(CH_2CH_2O)_v—(C_gH_{2g})—$ are prepared from the corresponding precursor alcohols, which are prepared by reacting a fluorinated vinyl ether with a polyethylene glycol. Typically the vinyl ether is slowly added to the glycol in a molar ratio of from about 1:1 to about 3:1, preferably at about 2:1. The reaction is conducted in the presence of sodium hydride, which is a catalyst that is basic enough to generate equilibrium amounts of the alkoxide anion from the glycol. Other suitable base catalysts include potassium hydride, sodium amide, lithium amide, potassium tert-butoxide, and potassium hydroxide. The reaction is conducted under an inert atmosphere such as nitrogen gas. Suitable solvents include dimethylformamide, dimethylacetamide, acetonitrile, tetrahydrofuran, and dioxane. Preferred is dimethylformamide. Cooling is employed to maintain the reaction temperature at from about 0° C. to about 30° C. The reaction is usually conducted for 1 to about 18 hours. The solvent is then removed using conventional techniques; such as evaporation in vacuum on a rotary evaporator, or in cases where the product is water insoluble and the solvent is water soluble, addition of the mixture to an excess of water followed by separation of the layers.

The reaction of perfluoropropyl vinyl ether with polyethylene glycol does not always go to completion. The average degree of conversion of the polyethylene glycol hydroxyl groups can be determined by $^1$H NMR spectroscopy. Typically mixtures of unreacted polyethylene glycol, the product of fluorinated vinyl ether adding to one end of polyethylene glycol (for example, structure B below), and the product of fluorinated vinyl ether adding to both ends of the polyethylene glycol (for example, structure A below) can be obtained. The relative amounts of the components of the mixture are affected by the ratio of the reactants, the reaction conditions, and the way in which the product is isolated. High ratios of the vinyl ether to glycol and long reaction times tend to favor Structure A, shown below. Lower ratios of vinyl ether to glycol and shorter reaction times give increased amounts of Structure B, shown below, and unreacted polyethylene glycol. It is sometimes possible to use the differences in solubility between Structures A, B, and the starting glycol to do selective solvent extraction of mixtures to obtain samples that are highly enriched in Structures A or B. The alcohol of Structure B is the required composition for the group $R_a$ (iii).

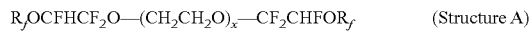
R$_f$OCFHCF$_2$O—(CH$_2$CH$_2$O)$_x$—CF$_2$CHFOR$_f$   (Structure A)

R$_f$OCFHCF$_2$O—(CH$_2$CH$_2$O)$_x$H   (Structure B)

Polyethylene glycols suitable for the use are commercially available from Sigma-Aldrich, Milwaukee, Wis. The fluorinated vinyl ether used in the above reaction is made by various methods. These methods include making fluorinated vinyl ethers by reacting a 2-alkoxypropionyl fluoride in a stationary bed of a metal carbonate, a tubular reactor filled with dried metal carbonate and equipped with a screw blade running through the tube, or a fluidized bed of metal carbonate. US Patent Application 2007/0004938 describes a process to produce fluorinated vinyl ether by allowing a 2-alkoxypropionyl fluoride to react with a metal carbonate under anhydrous conditions in a stirred bed reactor at a temperature above the decarboxylation temperature of an intermediate carboxylate to produce fluorinated vinyl ether. Examples of fluorinated vinyl ethers suitable for use include $CF_3$—O—$CF$=$CF_2$, $CF_3CF_2$—O—$CF$=$CF_2$, $CF_3CF_2CF_2$—O—$CF$=$CF_2$, and $CF_3CF_2CF_2CF_2$—O—$CF$=$CF_2$, each of which are available from E. I. du Pont de Nemours and Company, Wilmington, Del.

Compounds of formula (1) containing the group $R_fOCF(CF_3)CONH—(C_gH_{2g})—$ are prepared using an amino alcohol having formula $R_fOCF(CF_3)CONH—(C_gH_{2g})OH$ wherein $R_f$ and g are as defined in formula (1). These amino alcohols are made by the reaction of the corresponding fluorinated acyl fluoride with ethanolamine or other amino alcohols. Preferred fluorides are those containing a perfluoroalkyl group having two to six carbons. The reaction is conducted at a temperature below about 25° C.

Compounds of formula (1) containing the group $R_fOCFHCF_2O(C_wH_{2w})—$ wherein w is from about 2 to about 12, are prepared from the alcohol of formula $R_fOCFHCF_2O(C_wH_{2w})OH$. These alcohols are made by the reaction of a perfluorohydrocarbonvinyl ether with a diol in the presence of an alkali metal compound. Preferred ethers include those of formula $R_f$—O—$CF$=$CF_2$ wherein $R_f$ is a perfluoroalkyl of two to six carbons. The diol is used at about 1 to about 15 mols per mol of ether, preferably from about 1 to about 5 mols per mol of ether. Suitable alkali metal compounds include an alkali metal, alkali earth metal, alkali hydroxide, alkali hydride, or an alkali amide. Preferred are alkali metals such as Na, K or Cs, or alkali hydrides such as NaH or KH. The reaction is conducted at a temperature of from about 40° C. to about 120° C. The reaction can be conducted in an optional solvent, such as ether or nitrile.

Compounds of formula (1) containing the group $R_f(CH_2)_h[(CF_2CF_2)_i(CH_2CH_2)_j]_k—$ are obtained by preparation of fluoroalcohols of the formula $R_f(CH_2)_h[(CF_2CF_2)_i(CH_2CH_2)_j]_kOH$, wherein $R_f$ is a $C_1$ to $C_6$ perfluoroalkyl, subscript h is 1 to about 6, and subscripts i, j, and k are each independently 1, 2, 3, or a mixture thereof. These alcohols are prepared from oligomeric iodides ($C_nF_{2n+1}C_2H_4I$, $C_nF_{2n+1}CH_2I$ or $C_nF_{2n+1}I$) wherein subscript n is an integer from 1 to about 6, using an oleum treatment and hydrolysis. It has been found, for example, that reacting with oleum (15% $SO_3$) at about 60° C. for about 1.5 hours, followed by hydrolysis using an iced dilute $K_2SO_3$ solution, and then followed by heating to about 100° C. for about 30 minutes gives satisfactory results. But other reaction conditions can also be used. After being cooled to ambient room temperature, a solid is precipitated, isolated and purified. For example, the liquid is then decanted and the solid is dissolved in ether and washed with water saturated with NaCl, dried over anhydrous $Na_2SO_4$, and concentrated and dried under vacuum. Other conventional purificatiion procedures can be employed.

Alternatively, the alcohols of formula $R_f(CH_2)_h[(CF_2CF_2)_i(CH_2CH_2)_j]_kOH$ as defined above can be prepared by heating the oligomeric iodides $R_f(CH_2)_h[(CF_2CF_2)_i(CH_2CH_2)_j]_kI$ wherein $R_f$ and subscripts h, i, j, and k are as defined above for the corresponding alcohol, with N-methylformamide to about 150° C. and holding for about 19 hours. The reaction mixture is washed with water to give a residue. A mixture of this residue with ethanol and concentrated hydrochloric acid is gently refluxed (at about 85° C. bath temperature) for about 2.5 hours. The reaction mixture is washed with water, diluted with dichloromethane, and dried over sodium sulfate. The dichloromethane solution is concentrated and distilled at reduced pressure to give the alcohol. Optionally N,N-dimethylformamide can be used instead of N-methylformamide. Other conventional purification procedures can also be employed.

The iodides of formula $R_f(CH_2)_h[(CF_2CF_2)_i(CH_2CH_2)_j]_kI$ are preferably prepared by oligomerization of $C_nF_{2n+1}C_2H_4I$, $C_nF_{2n+1}CH_2I$ or $C_nF_{2n+1}I$ wherein n is 1 to about 6 using a mixture of ethylene and tetrafluoroethylene. The reaction can be conducted at any temperature from room temperature to about 150° C. with a suitable radical initiator. Preferably the reaction is conducted at a temperature of from about 40° to about 100° C. with an initiator which has about a 10 hour half-life in that range. The feed ratio of the starting materials in the gas phase, that is the moles of $C_nF_{2n+1}C_2H_4I$, $C_nF_{2n+1}CH_2I$ or $C_nF_{2n+1}I$ wherein n is 1 to about 6, versus the combined moles of ethylene and tetrafluoroethylene, can be used to control conversion of the reaction. This mole ratio is from about 1:3 to about 20:1, preferably from about 1:2 to 10:1, more preferably from about 1:2 to about 5:1 The mole ratio of ethylene to tetrafluoroethylene is from about 1:10 to about 10:1, preferably from about 3:7 to about 7:3, and more preferably from about 4:6 to about 6:4.

If desired, the major chemicals in the reaction mixture described above can be separated into individual components by differences in solubilities, melting points, vapor pressures and other features. For example, it has been found that the relative solubilities of such components in acetonitrile and tetrahydrofuran are useful in such purifications. Other solvents and methods can also be used, as readily determined by those skilled in the art.

The fluorinated alcohols and thiol-alcohols which are represented by $R_f$—$(C_gH_{2g})$—XH used the present invention are available either from Aldrich Chemical Co., Milwaukee, Wis., or available from E. I. du Pont de Nemours, Wilmington, Del.

One of the advantages of the present invention is that the non-ionic fluorinated polyoxyalkylene glycol diester surfactants of the present invention are synthesized in a way that avoids reacting polyalkylene glycol directly with fluorinated alcohol or thiol-alcohol, thus simplifying their synthesis. These non-ionic surfactants of the present invention are biodegradable easily in the environment due to the hydrolysis of the ester linking groups and the ready biodegradability of the polyoxyalkylene glycol dicarboxylic acid portion of the surfactant molecules.

The efficiency of the fluorinated surfactants, for example, in surface tension reduction, is proportional to the fluorinated carbon chain length of the fluorinated surfactants. Increasing the fluorinated carbon chain length increases the efficiency of surface tension reduction. The fluorinated polyoxyalkylene glycol diester surfactant of the present invention also increases the "fluorine efficiency" by using a minimum amount of the hereinabove described fluorinated polyoxyalkylene glycol diester surfactant and using low level of fluorine to obtain the desired surfactant effects.

The surface activity of the surfactant is characterized by its efficiency in lowering the surface tension at low concentrations by selectively adsorption on the interface of a medium. It is conventional to consider the two distinct components of the surfactant molecule separately, namely the hydrophile (or lipophobe) and the hydrophobe (or lipophile). Hydrophile-lipophile balance (HLB) value, which was described by Griffin in "Calculation of "HLB" values of nonionic surfactants" in American Perfumer and Essential Oil Review (1955), 65(No. 5), 26-9, is commonly used to relate a surfactant's properties to its physical structure. Although they are of an empirical nature, in many ways HLB values can be used quantitatively for determining the characteristics of a surfactant.

The HLB classification is especially useful for the nonionic ethoxylate surfactants, such as the surfactants of the present invention, where the degree of ethoxylation readily identifies a surfactant as being low, medium or high HLB. The HLB value of an ethoxylated nonionic surfactant is calculated from the following Equation:

$$HLB = \frac{\% \text{ Hydrophile by the weight of molecule}}{5}$$

Table 1 A and B show HLB values of the examples of the fluorinated polyoxyalkylene glycol ester surfactants of formula (1) of the present invention.

TABLE 1A

HLB of esters of structure
($RaOCOCH_2O$—$(CH_2CH_2O)n$—$CH_2COOH$)

| Ra Group | HLB values | | | |
|---|---|---|---|---|
| | n = 6 | n = 10 | n = 20 | n = 30 |
| $C_4F_9CH_2CF_2CH_2CH_2$ | 11.2 | 13.0 | 15.3 | 16.5 |
| $C_3F_7OCF_2CF_2CH_2CH_2$— | 11.2 | 12.9 | 15.3 | 16.5 |
| $C_3F_7OCFHCF_2OCH_2CH_2OCH_2CH_2$— | 10.6 | 12.3 | 14.8 | 16.1 |
| $C_3F_7OCFHCF_2OCH_2CH_2$— | 11.2 | 13.0 | 15.3 | 16.5 |
| $C_2F_5CH_2CH_2CF_2CF_2CH_2CH_2$— | 11.8 | 13.5 | 15.7 | 16.8 |
| $C_3F_7OCF(CF_3)CONHCH_2CH_2$— | 10.5 | 12.3 | 14.8 | 16.1 |

TABLE 1B

HLB of esters of structure
($RaOCOCH_2O$—$(CH_2CH_2O)n$—$CH_2COO$—$Ra$)

| Ra Group | HLB values | | | |
|---|---|---|---|---|
| | n = 6 | n = 10 | n = 20 | n = 30 |
| $C_4F_9CH_2CF_2CH_2CH_2$— | 7.8 | 9.6 | 12.4 | 14.0 |
| $C_3F_7OCF_2CF_2CH_2CH_2$— | 7.7 | 9.5 | 12.4 | 14.0 |
| $C_3F_7OCFHCF_2OCH_2CH_2OCH_2CH_2$— | 7.2 | 8.9 | 11.8 | 13.4 |
| $C_3F_7OCFHCF_2OCH_2CH_2$— | 7.8 | 9.6 | 12.4 | 14.0 |
| $C_2F_5CH_2CH_2CF_2CF_2CH_2CH_2$— | 8.4 | 10.2 | 13.0 | 14.5 |
| $C_3F_7OCF(CF_3)CONHCH_2CH_2$— | 7.1 | 8.9 | 11.7 | 13.4 |

By this classification, surfactants are assigned an HLB value between zero and twenty or higher. Low HLB values indicate surfactants with low water solubility or a high lipophilicity (i.e. oil solubility), while a high HLB values indicate a high water solubility. Preferred in the present invention are surfactants having an HLB range of from about 7 to about 17.

The present invention further comprises a method of altering surface behavior of a liquid comprising adding to the liquid a compound of formula (1) ads described above. The present invention includes the use of the fluorinated polyoxyalkylene glycol diester surfactant for altering surface behavior, typically for lowering surface tension and critical micelle concentration (CMC) values in a variety of applications, such as coating, cleaners, oil fields, and many other applications. Non-ionic surfactants are important fluorosurfactants and provide to liquids low surface and interfacial surface tension values and low CMC. They are useful in many applications involving wetting, leveling, antiblocking, foaming, penetration, spreading, flowing, emulsification and dispersion stabilization, and the like. Types of surface behavior which can be altered using the method of the present invention include wetting, penetration, spreading, leveling, flowing, emulsifying, dispersing, repelling, releasing, lubricating, etching, bonding, and stabilizing. Types of liquids which can be used in the method of the present invention include a coating composition, latex, polymer, floor finish, ink, emulsifying agent, foaming agent, release agent, repellency agent, flow modifier, film evaporation inhibitor, wetting agent, penetrating agent, cleaner, grinding agent, electroplating agent, corrosion inhibitor, etchant solution, soldering agent, dispersion aid, microbial agent, pulping aid, rinsing aid, polishing agent, personal care composition, drying agent, antistatic agent, floor finish, or bonding agent.

The fluorinated polyoxyalkylene glycol diester surfactants of the present invention are useful in a variety of applications where a low surface tension is desired, such as coating formulations for glass, wood, metal, brick, concrete, cement, natural and synthetic stone, tile, synthetic flooring, paper, textile materials, plastics, and paints. The surfactants of the present invention are useful in waxes, finishes, and polishes to improve wetting, leveling, and gloss for floors, furniture, shoe, and automotive care. The surfactants of the present invention are useful in a variety of aqueous and non-aqueous cleaning products for glass, tile, marble, ceramic, linoleum and other plastics, metal, stone, laminates, natural and synthetic rubbers, resins, plastics, fibers, and fabrics.

The surfactants and method of the present invention are suitable for the use in agricultural compositions. The surfactants of the present invention are useful as wetting agents for compositions containing herbicides, weed killers, hormone growth regulators, parasiticides, insecticides, germicides, bactericides, nematocides, microbiocides, defoliants or fertilizers, therapeutic agents, antimicrobials The surfactants of the present invention are also suitable as a wetting agent for foliage, for live stock dips and to wet live stock skins; and as an ingredient in sanitizing, discoloring and cleaning compositions, and in insect repellent compositions.

The surfactants and method of the present invention are suitable for the use in compositions for fluorochemical blood substitutes, textile treatment baths, fiber spin finishes, personal care products (including like shampoos, conditioners, creams, rinses), cosmetic products for the skin (such as therapeutic or protective creams and lotions, oil and water repellent cosmetic powders, deodorants and anti-perspirants), nail polish, lipstick, toothpastes, fabric care products (such as stain pretreatments and/or stain removers for clothing, carpets and upholstery), laundry detergents, rinse-aid (for car washes and in automatic dishwashers).

The surfactants and method of the present invention are further suitable for the use in the petroleum and gas industries as a wetting agent and for oil well treatments (including drilling muds and additives to improve tertiary oil well recovery, as well as in extreme pressure lubricants and as a lubricating cuffing oil improver, to improve penetration times), and as a treatment agent to prevent and remove film evaporation and gas/oil blocking for gas, gasoline, jet fuel, solvents and hydrocarbons.

The surfactants and method of the present invention are further suitable for the use in writing inks, printing inks, photography developer solutions, fighting forest fires, dry chemical fire extinguishing agents, aerosol-type fire extinguishers, thickening agents to form gels for solidifying or encapsulating medical waste, and photoresists, developers, cleaning solutions, oxide etching compositions, developers, polishers, and resist inks in the manufacturing, processing, and handling of semiconductors and electronics.

The surfactants and method of the present invention are further suitable for the use in textile and leather industries as a wetting agent, antifoaming agent, penetrating agent or emulsifying agent; or as a lubricant for textiles, nonwoven fabrics and leather treatment; for fiber finishes for spreading, and uniformity; as a wetting agent for dyeing; as a binder in nonwoven fabrics; and as a penetration additive for bleaches.

The surfactants and method of the present invention are further suitable for the use in the mining and metal working industries, in the pharmaceutical industry, automotives, building maintenance and cleaning, in household, cosmetic and personal products, and in photography and graphic arts to provide improved surface effects.

The surfactants and method of the present invention can be incorporated into products that function as antifogging agents for glass surfaces and photography films, and as antistatic agent for magnetic tapes, phonograph records, floppy disks, disk drives, rubber compositions, PVC, polyester film, photography films, and as surface treatments for optical elements (such as glass, plastic, or ceramic beads).

The surfactants and method of the present invention are also useful as foam control agents in polyurethane foams, spray-on oven cleaners, foamed kitchen and bathroom cleansers and disinfectants, aerosol shaving foams, and in textile treatment baths.

The surfactants and method of the present invention are useful as emulsifying agents for polymerization, particularly of fluoromonomers, as latex stabilizers, as mold release agents for silicones, photoemulsion stabilizers, inorganic particles, and pigments.

The surfactants and method of the present invention provide several unexpected advantages. The compounds are not prepared by electrochemical fluorination, and many are not prepared by telomerization. Thus the formation of large amounts of impurities are avoided, and products containing a mixture of homologues are not obtained. The surfactants of the present invention are more fluorine efficient than typical telomerization derived products. The lower level of fluorine present in the compounds of formula (1) of the present invention is more economical, but provides equivalent or superior performance to conventional surfactants containing higher levels of fluorine.

Materials and Test Methods

All solvents and reagents, unless otherwise indicated, were purchased from Sigma-Aldrich, Milwaukee, Wis., and used directly as supplied. $^{19}F$ NMR spectra were recorded on a Brucker DRX 400 or 500 Spectrometer. Chemical shifts have been reported in ppm (micrograms/g) relative to an internal reference ($CDCl_3$, $CFCl_3$ or TMS).

The following fluorinated chemicals are available from E. I. du Pont de Nemours and Company, Wilmington Del.:
Perfluoro-2-methyl-3-oxahexanoyl fluoride,
Perfluorobutyl iodide,
Vinylidene fluoride,
Perfluoropropylvinyl ether,
Perfluoroethylethyl iodide, and
Tetrafluoroethylene.

The following fluorinated chemicals were prepared as indicated below:
$C_4F_9CH_2CF_2I$ and $C_4F_9(CH_2CF_2)_2I$ were prepared by reacting perfluorobutyl iodide and vinylidene fluoride as described by Balague, et al, "Synthesis of Fluorinated Telomers, Part 1, Telomerization of Vinylidene Fluoride with Perfluoroalkyl Iodides", J. Fluorine Chem. (1995), 70(2), 215-23. The specific telomer iodides are isolated by fractional distillation.

$C_3F_7OCF_2CF_2I$ was prepared by reacting perfluoropropyl vinyl ether with iodine chloride and hydrofluoric acid with boron trifluoride as a catalyst as described by Viacheslav et al. in U.S. Pat. No. 5,481,028.

Test Method 1—Measurement of the Critical Micelle Concentration (CMC) and the Surface Tension Beyond CMC Surface tension was measured using a Kruess Tensiometer, K11 Version 2.501 in accordance with instructions with the equipment. The Wilhelmy Plate method was used. A vertical plate of known perimeter was attached to a balance, and the force due to wetting was measured. Ten replicates were tested of each dilution, and the following machine settings were used: Method: Plate Method SFT; Interval: 1.0s; Wetted length: 40.2 mm; Reading limit: 10; Min Standard Deviation: 2 dynes/cm; Gr. Acc.: 9.80665 m/s^2.

The Critical Micelle Concentration (CMC) is defined as the concentration of surfactants above which micelles are spontaneously formed, at which increased concentrations of surfactant essentially no longer reduce the surface tension. To determine CMC, the surface tension was measured as a function of surfactant concentration. Surface tension was then plotted vs. log concentration. The resulting curve had a nearly horizontal portion at concentrations higher than the CMC and had a negative steep slope at concentrations less than the CMC. The CMC was calculated as that concentration of the curve where the flat portion and the extrapolated steep slope intersected. The Surface Tension beyond CMC was the value in the flat portion of the curve. The CMC should be as low as possible to provide the lowest cost for effective performance.

Test Method 2—Wetting and Leveling Test

The wetting and leveling ability of the samples was tested by adding each sample to a floor polish (RHOPLEX® 3829, Rohm & Haas, Spring House, Pa.) and applying the mixture to half of a 12 inch×12 inch (30.36 cm×30.36 cm) vinyl tile stripped with Comet® cleaner. A 1% by weight solution of the surfactant to be tested was prepared by dilution with deionized water. Following the manufacturer protocols, a 100 g portion of the RHOPLEX® 3829 formulation was prepared, followed by addition of 0.75 g of the 1% by weight surfactant solution, to provide a test floor polish.

The test floor polish was applied to a tile by placing a 3 mL portion of the test polish in the center of the tile, spreading the solution from top to bottom using an applicator, and finally placing a large "X" across half of the tile, using the applicator. The tile was allowed to dry for 30 minutes. A total of 5 coats was applied. After each coat, the tile was rated on a 1 to 5 scale (1 being the worst, 5 the best) on the surfactant's ability to promote wetting and leveling of the polish on the tile surface. The rating was determined based on comparison of a tile treated with the floor polish that contained no fluorosurfactant or leveling aids according to the following scale:

Subjective Tile Rating Scale
1 Uneven surface coverage of the film, significant streaking and surface defects
2 Visible streaking and surface defects, withdrawal of the film from the edges of the tile
3 Numerous surface defects and streaks are evident but, generally, film coats entire tile surface
4 Minor surface imperfections or streaking
5 No visible surface defects or streaks

EXAMPLES

Example 1

A mixture of ethanolamine (13 g, 28 mmol) and ether (30 mL) was cooled to 15° C. Perfluoro-2-methyl-3-oxahexanoyl fluoride (33 g in ether 50 mL) was added dropwise to keep the reaction temperature below 25° C. After the addition, the reaction mixture was stirred at room temperature for one hour. The solid was removed by filtration and the filtrate was washed with hydrochloric acid (0.5N, 30 mL), water (2 times 30 mL), sodium hydrogen carbonate solution (0.5N, 20 mL), water (30 mL), and sodium chloride solution (saturated, 20 mL). It was then concentrated and dried in vacuum over night at room temperature to give N-(perfluoro-2-methyl-3-oxahexanoyl)-2-aminoethanol as a white solid 35 g, yield 95%. mp. 69-72° C. $^1H$ NMR ($CDCl_3$) δ 1.67 (bs, 1H), 3.57 (m, 2H), 3.80 (t, J=5 Hz, 2H), 6.91 (bs, 1H).

A 3-neck flask equipped with an air condenser, stopper and septa kept under nitrogen flush was charged with dry dichloromethane (100 mL). The flask was cooled to 15° C. and poly(ethylene glycol) bis(carboxymethyl) ether (Mw ~600, average n=10-11, 1.0 g) was added followed by 1-[3-(dimethylamino)propyl]-3-ethylcarbodiimide hydrochloride (EDCl) (0.636 g) and 4-(dimethylamino)pyridine (0.407 g). The mixture was stirred for 10 minutes and to the resulting suspension was added $C_3F_7OCFCF_3CONH(CH_2)_2OH$ (1.24 g). The reaction mixture was warmed to room temperature and allowed to stir overnight. GC-analysis showed the complete conversion of fluorinated alcohol to the ester. The resulting clear solution was transferred to a separatory funnel and washed with 2% HCl (2×50 mL), saturated $NaHCO_3$ solution (2×50 mL) and brine (1×50 mL). The organic layer was dried (anhydrous $MgSO_4$), concentrated and dried under vacuum to provide fluorinated polyoxyalkylene glycol-diester (0.750 g) as a colorless oil. IR, neat, 3325 $cm^{-1}$, N—H stretch, 1756 $cm^{-1}$, C=O stretch of ester, 1721 $cm^{-1}$ C=O stretch of amide. $^1H$ NMR ($CDCl_3$): δ 4.27 (t, J=4.8 Hz, 4H, $OCH_2$), 4.10 (s, 4H, $COCH_2O$), 3.64 (q, J=5.2 Hz, 4H, N—$CH_2$), 3.58 (bs, polyoxyalkylene glycol $OCH_2^s$), 3.0 (bs, 2H, NH): $^{19}F$ NMR ($CDCl_3$): δ −81.5 (dm, J=146. Hz, 2F), −81.9 (m, 6F), −82.7 (m, 6F), −85.3 (dm, J=148. Hz, 2F), −130.0 (bs, 4F), −133.3 (m, 2F). The product was a fluorinated polyoxyalkylene glycol diester represented by the structure $C_3F_7OCF(CF_3)CONHCH_2CH_2OCOCH_2O$—$(CH_2CH_2O)_n$—$CH_2COOCH_2CH_2NHCOCF(CF_3)OC_3F_7$, which was evaluated for CMC and surface tension beyond the CMC by Test Method 1; the results are shown in Table 2.

Example 2

A similar procedure as described in Example 1 was followed using poly(ethylene glycol) bis(carboxymethyl) ether (Mw ~1000, average n=19-20, 1.1 g) and $C_3F_7OCFCF_3CONH(CH_2)_2OH$ (0.903 g) prepared as in Example 1. The reaction mixture was warmed to room temperature and allowed to stir overnight. GC-analysis showed the complete conversion of fluorinated alcohol to the ester. The resulting clear solution was transferred to a separatory funnel and washed with 2% HCl (2×50 mL), saturated $NaHCO_3$ solution (2×50 mL) and brine (1×50 mL). The organic layer was dried (anhydrous $MgSO_4$), concentrated and dried under vacuum to provide fluorinated polyoxyalkylene glycol-diester (1.72 g) as a colorless oil. IR, neat, 3291 $cm^{-1}$, N—H stretch, 1754 $cm^{-1}$, C=O stretch of ester, 1716 $cm^{-1}$ C=O stretch of amide. $^1H$ NMR ($CDCl_3$): δ 4.31 (t, J=4.8 Hz, 4H, $OCH_2$), 4.18 (s, 4H, $COCH_2O$), 3.71 (q, J=5.2

Hz, 4H, N—CH$_2$), 3.64 (bs, polyoxyalkylene glycol OCH$_2$$^s$), 3.0 (bs, 2H, NH): $^{19}$F NMR (CDCl$_3$): δ –81.3 (dm, J=147. Hz, 2F), –81.8 (m, 6F), –82.7 (m, 6F), –85.4 (dm, J=148. Hz, 2F), –130.1 (bs, 4F), –133.4 (m, 2F). The product was a fluorinated polyoxyalkylene glycol diester represented by the structure of C$_3$F$_7$OCF(CF$_3$)CONHCH$_2$CH$_2$OCOCH$_2$O—(CH$_2$CH$_2$O)$_n$—CH$_2$COOCH$_2$CH$_2$NHCOCF(CF$_3$)OC$_3$F$_7$, which was evaluated for CMC and surface tension beyond the CMC by Test Method 1; the results are shown in Table 2. The product was added to floor polish and evaluated for wetting and leveling according to Test Method 2; results are in Table 3.

Example 3

Ethylene (25 g) was introduced to an autoclave charged with C$_4$F$_9$CH$_2$CF$_2$I (217 g) and d-(+)-limonene (1 g), and the reactor heated at 240° C. for 12 hours. The product was isolated by vacuum distillation to provide C$_4$F$_9$CH$_2$CF$_2$CH$_2$CH$_2$I. Fuming sulfuric acid (70 mL) was added slowly to 50 g of C$_4$F$_9$CH$_2$CF$_2$CH$_2$CH$_2$I and mixture was stirred at 60° C. for 1.5 hours. The reaction was quenched with ice-cold 1.5% by weight Na$_2$SO$_3$ aqueous solution and heated at 95° C. for 0.5 hours. The bottom layer was separated and washed with 10% by weight aqueous sodium acetate and distilled to provide C$_4$F$_9$CH$_2$CF$_2$CH$_2$CH$_2$OH: bp 54-57° C. at 2 mmHg (267 Pa).

A 4-neck flask with condenser, Dean-Stark trap, magnetic stirrer, thermocouple, and heating mantle was charged with poly(ethylene glycol) bis(carboxymethyl) ether (Mw ~600, average n=10-11, 10.0 grams), C$_4$F$_9$CH$_2$CF$_2$CH$_2$CH$_2$OH (10.9 grams), p-toluene sulfonic acid (0.22 grams), and toluene (100 grams). After refluxing for 15 hours, GC analysis confirmed formation of the di-ester. Calcium hydroxide (0.22 grams) was added and the precipitate was removed by filtering while hot, followed by the removal of toluene via the rotary evaporator. The reaction product was dissolved in about 400 mL of water followed by filtering to give an approximately 5 weight percent aqueous solution of fluorinated polyoxyalkylene glycol di-ester represented by the structure C$_4$F$_9$CH$_2$CF$_2$CH$_2$CH$_2$OCOCH$_2$O—(CH$_2$CH$_2$O)$_n$—CH$_2$COOCH$_2$CH$_2$CF$_2$CH$_2$C$_4$F$_9$. The product was evaluated for CMC and surface tension beyond the CMC by Test Method 1; the results are shown in Table 2.

Example 4

By following a similar procedure as described in Example 1, using poly(ethylene glycol) bis(carboxymethyl) ether (Mw ~1000, average n=19-20, 1.1 g) and C$_4$F$_9$CH$_2$CF$_2$CH$_2$CH$_2$OH (0.794 g) the corresponding fluorinated polyoxyalkylene glycol-diester (1.58 g) was produced as a colorless oil. IR, neat, 1750 cm$^{-1}$, C=O stretch of ester: $^{19}$F NMR (CDCl$_3$): δ –81.4 (m, 6F), –91.9 (m, 4F), –113.1 (m, 4F), –126.1 (m, 4F). The product was a fluorinated polyoxyalkylene glycol diester represented by the structure C$_4$F$_9$CH$_2$CF$_2$CH$_2$CH$_2$OCOCH$_2$O—(CH$_2$CH$_2$O)$_n$—CH$_2$COOCH$_2$CH$_2$CF$_2$CH$_2$C$_4$F$_9$, which was evaluated for CMC and surface tension beyond the CMC by Test Method 1; the results are shown in Table 2.

Example 5

A one-gallon reactor was charged with perfluoroethylethyl iodide (850 g). After cool evacuation, ethylene and tetrafluoroethylene in a ratio of 27:73 were added until pressure reached 60 psig (414 kPa). The reaction was then heated to 70° C. More ethylene and tetrahydrofuran in a 27:73 ratio were added until pressure reached 160 psig (1.205 MPa). A lauroyl peroxide solution (4 g lauroyl peroxide in 150 g perfluoroethylethyl iodide) was added at a 1 mL/min. rate for 1 hour. Gas feed ratio was adjusted to 1:1 of ethylene and tetrafluoroethylene and the pressure was kept at 160 psig (1.205 MPa). After about 67 g of ethylene was added, both ethylene and tetrafluoroethylene feeds were stopped. The reaction was heated at 70° C. for another 8 hours. The volatiles were removed by vacuum distillation at room temperature. A solid of oligomer ethylene-tetrafluoroethylene iodides C$_2$F$_5$(CH$_2$)$_2$[(CF$_2$CF$_2$)(CH$_2$CH$_2$)]$_k$I (773 g) wherein k was a mixture of 2 and 3 in about a 2:1 ratio was obtained. An oligomer iodide mixture, prepared as described above (46.5 g) without separation of the iodides was mixed with N-methylformamide (NMF, 273 mL) and heated to 150° C. for 19 h. The reaction mixture was washed with water (4×500 mL) to give a residue. A mixture of this residue, ethanol (200 mL), and concentrated hydrochloric acid (1 mL) was gently refluxed (85° C. bath temperature) for 24 h. The reaction mixture was poured into water (300 mL). The solid was washed with water (2×75 mL) and dried under vacuum (2 torr, 267 Pa) to give a solid, 24.5 g. About 2 g of product was sublimed. The total yield of oligomer alcohols C$_2$F$_5$(CH$_2$)$_h$[(CF$_2$CF$_2$)(CH$_2$CH$_2$)]$_k$OH wherein k was a mixture of 2 and 3 in about a 2:1 ratio was 26.5 g.

A 4-neck flask with condenser, Dean-Stark trap, magnetic stirrer, thermocouple, and heating mantle was charged with poly(ethylene glycol) bis(carboxymethyl) ether (Mw ~600, average n=10-11, 10.0 grams), C$_2$F$_5$(CH$_2$)$_h$[(CF$_2$CF$_2$)(CH$_2$CH$_2$)]$_k$OH wherein k was a mixture of 2 and 3 (10.9 grams), p-toluene sulfonic acid (0.21 grams), and toluene (100 grams). After refluxing for 15 hours, GC analysis confirmed formation of the di-ester. Calcium hydroxide (0.21 grams) was added and the precipitate was removed by filtering while hot, followed by the removal of toluene via the rotary evaporator. The reaction product was dissolved in about 400 mL of water followed by filtering to produce an approximately 5 weight percent aqueous solution of fluorinated polyoxyalkylene glycol di-ester represented by the structure of C$_2$F$_5$(CH$_2$)$_h$[(CF$_2$CF$_2$)(CH$_2$CH$_2$)]$_k$—OCOCH$_2$O—(CH$_2$CH$_2$O)$_n$—CH$_2$COO[(CH$_2$CH$_2$)(CF$_2$CF$_2$)]$_k$(CH$_2$)$_h$C$_2$F$_5$, wherein k was a mixture of 2 an 3. The product was evaluated for CMC and surface tension beyond the CMC by Test Method 1; the results are shown in Table 2.

Example 6

By following a similar procedure as described in Example 1, using poly(ethylene glycol) bis(carboxymethyl) ether (Mw ~1000, average n=19-20, 1.1 g) and C$_2$F$_5$(CH$_2$)$_h$[(CF$_2$CF$_2$)(CH$_2$CH$_2$)]$_k$OH (0.706 g where h=2, k=1) the corresponding fluorinated polyoxyalkylene glycol-diester (1.54 g) was produced as a colorless oil. IR, neat, 1751 cm$^{-1}$, C=O stretch of ester. $^{19}$F NMR (CDCl$_3$): δ –87.8 (s, 6F), –116.4 (m, 4F), –117.8 (m, 4F), –121.1 (m, 4F). The product was a fluorinated polyoxyalkylene glycol diester represented by the structure C$_2$F$_5$(CH$_2$)$_h$[(CF$_2$CF$_2$)(CH$_2$CH$_2$)]$_k$—OCOCH$_2$O—(CH$_2$CH$_2$O)$_n$—CH$_2$COO[(CH$_2$CH$_2$)(CF$_2$CF$_2$)]$_k$(CH$_2$)$_h$C$_2$F$_5$, which was evaluated for CMC and surface tension beyond the CMC by Test Method 1; the results are shown in Table 2. The product was added to floor polish and evaluated for wetting and leveling according to Test Method 2; results are in Table 3.

Comparative Example A

A 4-neck flask with nitrogen inlet with gas bubbler, overhead stirrer, condenser, and stopper was charged with 1H,1H, 2H,2H-perfluoro-1-octanol (2.0 grams) dissolved in dichloromethane (50 mL). Dicyclohexyl carbodiimide (DCC, 1.1 grams) dissolved in dichloromethane (50 mL) was added to the flask. The combined dichloromethane solution was cooled to 0° C. followed by the dropwise addition of poly(ethylene glycol) bis(carboxymethyl) ether (Mw ~600, average n=10-11, 1.65 grams) dissolved in dichloromethane (50 mL) over about 30 minutes. The reaction mixture was warmed to room temperature over about one hour and the nitrogen inlet was removed. The reaction mixture was stirred at room temperature for eight hours followed by gravity filtration and removal of solvent by rotary evaporation. GC analysis confirmed formation of the diester, which was dissolved in about 60 mL of water followed by filtering to produce an approximately 5 weight percent aqueous solution of a fluorinated polyoxyalkylene glycol diester represented by the structure $C_6F_{13}CH_2CH_2OCOCH_2O$—$(CH_2CH_2O)_n$—$CH_2COOCH_2CH_2C_6F_{13}$. The product was evaluated for CMC and surface tension beyond the CMC by Test Method 1; the results are shown in Table 2. The product was added to floor polish and evaluated for wetting and leveling according to Test Method 2; results are in Table 3.

Comparative Example B

A 4-neck flask with nitrogen inlet with gas bubbler, overhead stirrer, condenser, and stopper was charged with 1H,1H,2H,2H-perfluoro-1-octanol (2.0 grams) dissolved in dichloromethane (50 mL). Dicyclohexyl carbodiimide (DCC, 1.1 grams) dissolved in dichloromethane (50 mL) was added to the flask. The combined dichloromethane solution was cooled to 0° C. followed by the dropwise addition of poly(ethylene glycol) bis(carboxymethyl) ether (Mw ~1000, average n~20, 2.75 grams) dissolved in dichloromethane (50 mL) over about 30 minutes. The reaction mixture was warmed to room temperature over about one hour and the nitrogen inlet was removed. The reaction mixture was stirred at room temperature for eight hours followed by gravity filtration and removal of solvent by rotary evaporation. GC analysis confirmed formation of the diester, which was dissolved in about 60 mL of water followed by filtering to produce an approximately 5 weight percent aqueous solution of fluorinated polyoxyalkylene glycol diester represented by the structure $C_6F_{13}CH_2CH_2OCOCH_2O$—$(CH_2CH_2O)_n$—$CH_2COOCH_2CH_2C_6F_{13}$. The product was evaluated for CMC and surface tension beyond the CMC by Test Method 1; the results are shown in Table 2.

Comparative Example C

A 4-neck flask with nitrogen inlet with gas bubbler, overhead stirrer, condenser, and stopper was charged with 1H,1H,2H,2H-perfluoro-1-octanol (1.0 grams) dissolved in dichloromethane (50 mL). Dicyclohexyl carbodiimide (DCC, 0.57 grams) dissolved in dichloromethane (50 mL) was added to the flask. The combined dichloromethane solution was cooled to 0° C. followed by the dropwise addition of poly(ethylene glycol) bis(carboxymethyl) ether (Mw ~1450, average n~30, 1.99 grams) dissolved in dichloromethane (50 mL) over about 30 minutes. The reaction mixture was warmed to room temperature over about one hour and the nitrogen inlet was removed. The reaction mixture was stirred at room temperature for eight hours followed by gravity filtration and removal of solvent by rotary evaporation. GC analysis confirmed formation of the diester, which was dissolved in about 60 mL of water followed by filtering to produce an approximately 5 weight percent aqueous solution of fluorinated polyoxyalkylene glycol diester represented by the structure $C_6F_{13}CH_2CH_2OCOCH_2O$—$(CH_2CH_2O)_n$—$CH_2COOCH_2CH_2C_6F_{13}$. The product was evaluated for CMC and surface tension beyond the CMC by Test Method 1; the results are shown in Table 2.

Comparative Example D

A 4-neck flask with condenser, Dean-Stark trap, magnetic stirrer, thermocouple, and heating mantle was charged with poly(ethylene glycol) bis(carboxymethyl) ether (Mw ~250, average n~3, 5.0 grams), Zonyl BA-N alcohol (20.6 grams, a perlfuoroalkyl ethyl alcohol containing a mixture of homologues of perfluoroalkyl chains containing 6 to 20 carbon atoms) commercially available from E. I. du Pont de Nemours, Wilmington, Del.), p-toluene sulfonic acid (0.26 grams), and toluene (100 grams). After refluxing for 15 hours, GC analysis confirmed formation of the di-ester. Calcium hydroxide (0.26 grams) was added and the precipitate was removed by filtering while hot, followed by the removal of toluene via the rotary evaporator. The reaction product was dissolved in about 500 mL of water followed by filtering to produce an approximately 5 weight percent aqueous solution of fluorinated polyoxyalkylene glycol di-ester represented by the structure $C_jF_{2j+1}CH_2CH_2OCOCH_2O$—$(CH_2CH_2O)_n$—$CH_2COOCH_2CH_2C_jF_{2j+1}$ wherein j is 6 to 20 and n is 3. The product was evaluated for CMC and surface tension beyond the CMC by Test Method 1; the results are shown in Table 2.

Comparative Example E

This example was a commercially available fluoroalkyl ethoxylate nonionic surfactant in water prepared according to U.S. Pat. No. 5,567,857, which is available from E. I. du Pont de Nemours and Company, Wilmington, Del.

The product was evaluated for performance as a wetting and leveling agent in a commercial floor polish Rhoplex® 3829 (N-29-1) available from Rohm & Haas, Spring House, Pa., according to Test Method 2. In a control, no leveling agent was added.

TABLE 2

| | | Surface Tension | | |
|---|---|---|---|---|
| Example* | $R_a$ | polyoxyalkylene glycol Size (Mw) | Critical Micelle Concn. (% by weight) | Surface Tension Beyond CMC (mN/m) |
| 1 | $C_3F_7OCF(CF_3)CONHCH_2CH_2$— | polyoxyalkylene glycol 600 | 0.005 | 21.7 |
| 2 | $C_3F_7OCF(CF_3)CONHCH_2CH_2$— | polyoxyalkylene glycol 1000 | 0.001 | 20.5 |

TABLE 2-continued

Surface Tension

| Example* | $R_a$ | polyoxyalkylene glycol Size (Mw) | Critical Micelle Concn. (% by weight) | Surface Tension Beyond CMC (mN/m) |
|---|---|---|---|---|
| 3 | $C_4F_9CH_2CF_2CH_2CH_2$— | polyoxyalkylene glycol 600 | 0.00044 | 19.6 |
| 4 | $C_4F_9CH_2CF_2CH_2CH_2$— | polyoxyalkylene glycol 1000 | 0.001 | 20.5 |
| 5 | $C_2F_5(CH_2)_h[(CF_2CF_2)_i(CH_2CH_2)_j]_k$— | polyoxyalkylene glycol 600 | 0.0017 | 19.4 |
| 6 | $C_2F_5(CH_2)_h[(CF_2CF_2)_i(CH_2CH_2)_j]_k$— | polyoxyalkylene glycol 1000 | 0.005 | 20.8 |
| Comparative A | $C_6F_{13}CH_2CH_2$— | polyoxyalkylene glycol 600 | 0.014 | 19.8 |
| Comparative B | $C_6F_{13}CH_2CH_2$— | polyoxyalkylene glycol 1000 | 0.097 | 17.8 |
| Comparative C | $C_6F_{13}CH_2CH_2$— | polyoxyalkylene glycol 1450 | 0.21 | 17.0 |
| Comparative D | $C_jF_{2j+1}CH_2CH_2$— | polyoxyalkylene glycol 250 | 0.011 | 21.6 |

*Example was added to deionized water by weight based on solids of the additive in deionized water; Standard Deviation <1 dynes/cm; Temperature 23° C.

Examples 1-6 showed better (lower) critical micelle concentration than Comparative Examples A-D. Surface tension beyond CMC was comparable in performance.

TABLE 3

Ratings for Wetting and Leveling

| | Coating No. | | | | | |
|---|---|---|---|---|---|---|
| | 1 | 2 | 3 | 4 | 5 | |
| | | | Rating | | | Average |
| Control (Blank) | 2 | 1 | 1 | 1 | 1 | 1.2 |
| Comparative Example E | 2.5 | 3 | 3.5 | 3.5 | 3 | 3.1 |
| Comparative Example A | 2 | 3 | 3.5 | 3.5 | 3 | 3.0 |
| Example 2 | 2 | 3 | 3.5 | 3.5 | 3 | 3.1 |
| Example 6 | 2 | 2.5 | 2.5 | 1.5 | 2 | 2.1 |

In Table 3 a higher rating indicates superior performance. The results indicate that Examples 2 and 6 showed wetting and leveling characteristics significantly better than the control and similar to that of Comparative Examples A and E, despite having less fluorine present.

What is claimed is:

1. A compound of formula (1):

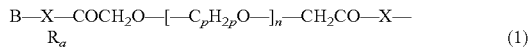

(1)

wherein
B is M or $R_a$,
M is an ionizable hydrogen, ammonium, alkali metal, or alkaline earth metal,
p is from about 2 to about 4,
n is from about 5 to about 43,
X is O, S, or $SCH_2CH_2O$,
$R_a$ is $R_f(CH_2CF_2)_d$—$(C_gH_{2g})$—; $R_f[OCF_2CF_2]_r$—$(C_gH_{2g})$—; $R_f(CH_2)_h[(CF_2CF_2)_i(CH_2CH_2)_j]_k$—; or $R_fOY$—;
Y is $CFHCF_2O(CH_2CH_2O)_v$—$(C_9H_2O)$—; $CFHCF_2O(C_wH_{2w})$—; of $CF(CF_3)CONH$—$(C_gH_{2g})$—;
each $R_f$ is independently $C_cF_{(2c+1)}$ wherein c is 1 to about 6;
d is 1 to about 3;
g is 1 to about 4;
r is 1 to about 4;
h is 1 to about 6;
i, j, and k are each independently 1, 2, or 3, or a mixture thereof; provided that the total number of carbon atoms in $R_f(CH_2)_h[(CF_2CF_2)_i(CH_2CH_2)_j]_k$— is from about 8 to about 22;
v is 1 to about 4; and
w is from about 2 to about 12.

2. The compound of claim 1 wherein, n is 6 to 32.

3. The compound of claim 2 wherein, n is 6, 10, 20, or 30.

4. The compound of claim 1 wherein X is O.

5. The compound of claim 1 wherein $R_a$ is $R_f(CH_2CF_2)_d$—$(C_gH_{2g})$—; $R_f$ is $C_cF_{(2c+1)}$ wherein c is 4 or 6; d is 1 or 2; and g is 2.

6. The compound of claim 1 wherein $R_a$ is $R_f[OCF_2CF_2]_r$—$(C_gH_{2g})$—; $R_f$ is $C_cF_{(2c+1)}$ wherein c is 2 or 3; r is 1, 2 or 3; and g is 2.

7. The compound of claim 1 wherein $R_a$ is $R_fOY$, Y is $CFHCF_2$—O—$(CH_2CH_2O)_v$—$(C_gH_{2g})$—, v is 1 or 2, and g is 2.

8. The compound of claim 1 wherein $R_a$ is $R_fOY$—; $R_f$ is $C_cF_{(2c+1)}$ wherein c is 1, 2 or 3; Y is $CFHCF_2O(C_wH_{2w})$—; and w is 2, 3 or 4.

9. The compound of claim 1 wherein $R_a$ is $R_fOY$—; $R_f$ is $C_cF_{(2c+1)}$ wherein c is 1, 2 or 3; Y is $CF(CF_3)CONH$—$(C_gH_{2g})$—, and g is 2.

10. The compound of claim 1 wherein $R_a$ is $R_f(CH_2)_h[(CF_2CF_2)_i(CH_2CH_2)_j]_k$—; $R_f$ is $C_cF_{(2c+1)}$ wherein c is 1, 2, or 3; h is 2; k is 1, 2 or 3; I and j are each 1, and X is O or $SCH_2CH_2O$.

11. A compound of claim 1, or a mixture thereof, having a surface tension of less than about 25 mN/M at a concentration of 0.6% by weight in water.

12. A compound of claim 1, or a mixture thereof, having a surface tension of less than about 21 mN/M at a concentration of 0.6% by weight in water.

13. A compound of claim 1 having an HLB of from about 7 to about 17.

14. A method of altering the surface behavior of a liquid comprising adding to the liquid the compound of formula (1) or a mixture thereof:

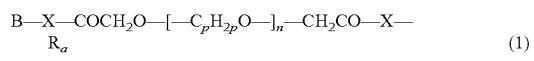

(1)

wherein
  B is M or $R_a$,
  M is an ionizable hydrogen, ammonium, alkali metal, or alkaline earth metal,
  p is from about 2 to about 4,
  n is from about 5 to about 43,
  X is O, S, or $SCH_2CH_2O$,
  $R_a$ is $R_f(CH_2CF_2)_d$—$(C_gH_{2g})$—; $R_f[OCF_2CF_2]_r$—$(C_gH_{2g})$—; $R_f(CH_2)_h[(CF_2CF_2)_i(CH_2CH_2)_j]_k$—; or $R_fOY$—;
  Y is $CFHCF_2O(CH_2CH_2O)_v$—$(C_gH_{2g})$—; $CFHCF_2O(C_wH_{2w})$—; or $CF(CF_3)CONH$—$(C_gH_{2g})$—;
  each $R_f$ is independently $C_cF_{(2c+1)}$ wherein c is 1 to about 6;
  d is 1 to about 3;
  g is 1 to about 4;
  r is 1 to about 4;
  h is 1 to about 6;
  i, j, and k are each independently 1, 2, or 3, or a mixture thereof; provided that the total number of carbon atoms in $R_f(CH_2)_h[(CF_2CF_2)_i(CH_2CH_2)_j]_k$— is from about 8 to about 22;
  v is 1 to about 4; and
  w is from about 2 to about 12.

15. The method of claim 14 wherein the altering the surface behavior is lowering the surface tension.

16. The method of claim 14 wherein the surface behavior is selected from the group consisting of wetting, penetration, spreading, leveling, flowing, emulsifying, dispersing, repelling, releasing, lubricating, etching, bonding, and stabilizing.

17. The method of claim 14 wherein the liquid is a coating composition, latex, polymer, floor finish, ink, emulsifying agent, foaming agent, release agent, repellency agent, flow modifier, film evaporation inhibitor, wetting agent, penetrating agent, cleaner, grinding agent, electroplating agent, corrosion inhibitor, etchant solution, soldering agent, dispersion aid, microbial agent, pulping aid, rinsing aid, polishing agent, personal care composition, drying agent, antistatic agent, floor finish, or bonding agent.

* * * * *